Sept. 28, 1965     R. LUCIEN     3,208,352
ELECTRO-HYDRAULICALLY CONTROLLED POSITIONING DEVICE
Filed Nov. 9, 1964
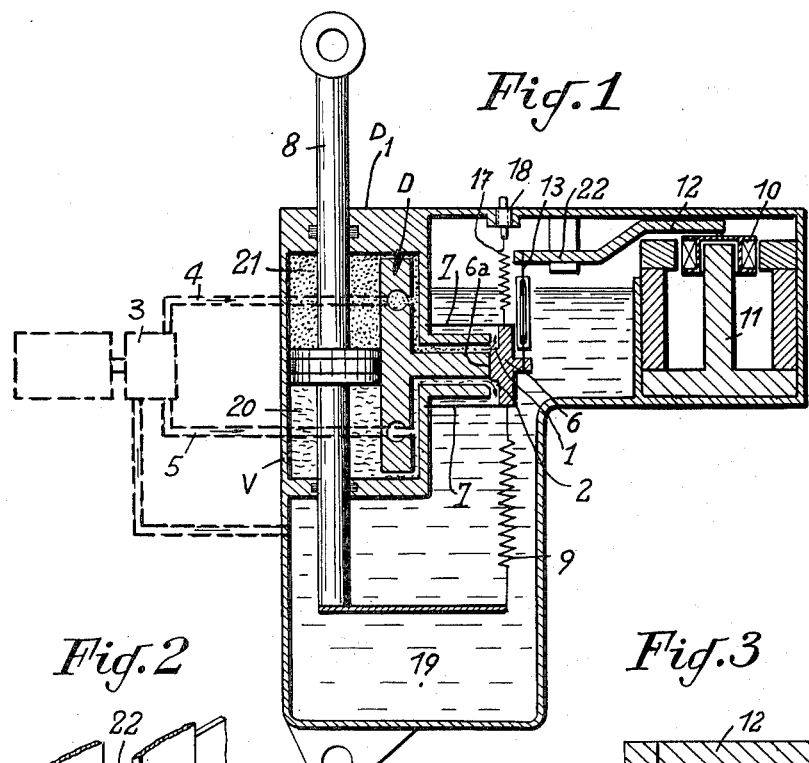
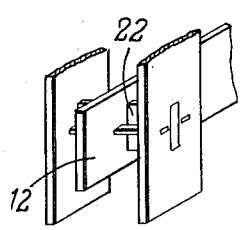
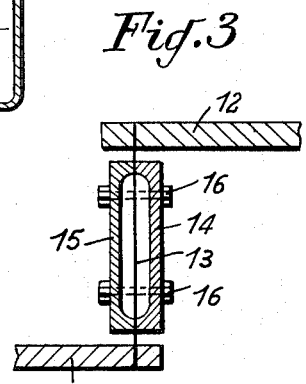
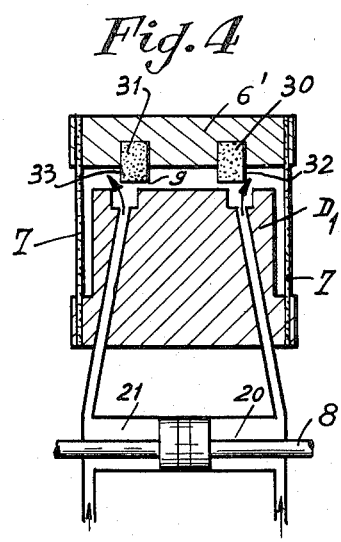

United States Patent Office 3,208,352
Patented Sept. 28, 1965

3,208,352
ELECTRO-HYDRAULICALLY CONTROLLED POSITIONING DEVICE
Rene Lucien, 56 Boulevard Maillot, Neuilly-sur-Seine, France
Filed Nov. 9, 1964, Ser. No. 409,802
Claims priority, application France, May 13, 1960, 827,154, Patent 1,264,660
13 Claims. (Cl. 91—51)

This application is a continuation-in-part application of my earlier application filed May 10, 1961, Serial No. 109,059, now abandoned.

The invention relates to a device or apparatus comprising essentially a hydraulic jack provided with an electro-hydraulic control device, the function of which is to permit adjusting the position of the jack proportional to a control current of low power levels. In order to achieve this function, the system according to the invention employs a distributor of the type employing a recycle or feed-back effect which in itself is known to control the position of the jack.

In electro-hydraulic positioning devices of the above type, the member for distributing the fluid to the jack must be very sensitive and, for this purpose, a distributor is generally employed having a slide valve which is mounted on flexible plates or blades.

However, this arrangement is not sufficient to make the positioning devices of known type using closed-center distributors sufficiently sensitive.

It is an object of the invention to provide an improved positioning device with increased sensitivity.

In this respect, in order to avoid any parasitic movement of the movable portion or slide valve of the distributor with respect to the fixed portion in directions other than the direction of the controlled displacement, the blades must have large dimensions but must be of low rigidity in the direction of the controlled displacement. In the conventional closed-center distributors, the flow of the fluid through the feed orifices creates so-called Bernouilli forces, proportional to the rate of flow of the fluid and to the opening, which tend to return the distributor slide valve to its neutral position. In order to control such a distributor, it is therefore necessary to overcome these forces, which are additive to the mechanical rigidity of the blades and thereby reduce the sensitivity of the positioning device.

Moreover, when the movable member of the distributor is in one of its end positions, in order quickly to control the jack, it is necessary that the fluid be unable to escape through the sizable clearances existing between the fixed element and the movable element, at the level of the feed orifices. But in conventional distributors, the leakage perimeter for the fluid discharged from said orifices is of considerable size, which also results in another disadvantage, since the movable member carried by the flexible blades resists the pressure which the fluid exerts at the level of said orifices and thus tends to move away from the fixed member.

According to the present invention, these disadvantages of electro-hydraulically controlled conditioning devices are overcome by the use of a flat slide valve of the "open-center" type having two different supply systems each of which corresponds to one chamber of the jack and which operate by means of nozzles.

When such a distributor is used, the Bernouilli forces due to the flow of the fluid do not increase the mechanical rigidity of the blades which support the slide valve; on the contrary, they act in a reverse sense, thereby substantially increasing the sensitivity of the device.

Moreover, the nozzles have a much smaller cross-section than that of the usual supply orifices, and the leakages of the distributor are thereby reduced to a minimum.

The distributor with flat slide valve used according to the present invention offers the additional advantage of great mechanical simplicity which makes it possible to easily and cheaply mass produce positioning devices having identical characteristics.

The invention will be described with reference to an embodiment shown in the appended drawing, given by way of non-limitative example.

FIGURE 1 shows diagrammatically the general arrangement of the device according to the invention;

FIGURES 2 and 3 are two details of the device in FIG. 1, and

FIGURE 4 schematically illustrates the manner of operation of the device according to the invention with a modified form of slide valve.

The essential member of the device according to the invention is the open-center distributor D. This is constituted as follows: two nozzles 1 and 2 are situated in the same plane in distributor body $D_1$ and each communicates with a chamber 20, 21 of the jack V and is separately supplied by a flow of liquid which passes wholly through these nozzles. The two separate hydraulic supply systems of the two nozzles correspond to clearly defined rates of flow, which may be equal or unequal, and may be supplied either from a pump 3 with two different outputs (two separate deliveries 4 and 5 or an output divider), or from two separate pumps.

In front of these nozzles there is adapted to move a slide valve 6 (FIG. 1), separated from the distributor body $D_1$ by a gap. The gap is too small to be seen in FIG. 1 but can be seen in FIG. 4 as gap "g" between slide valve $6^1$ and distributor body $D_1$. The slide valve, which is elastically mounted on two flexible blades 7, is further coupled, on the one hand, to the rod 8 of the jack by means of a tension spring 9 and, on the other hand, to the moving coil 10 of the magnetic control circuit 11 through the intermediary of the lever 12 and of the blade 13. Blade 13, in order to improve its operation in compression, is preferably gripped between two hollowed-out members 14 and 15 clamped together by bolts 16 (FIG. 3). A compensating spring 17 enables obtaining a zero adjustment by means of the screw 18.

The operation of the device according to the invention is as follows:

Statically, in each position of the jack, the force developed by the magnetic circuit balances the tractive pull resulting from the counter-acting spring 9 and the compensating spring 17. Any variation of the control current results in a variation of the force exerted by the moving coil 10, and this results in a disequilibrium of the control slide valve 6 and in consequence the closure of one of the nozzles 1 or 2 and the opening of the other. One of the liquid deliveries then passes at least partly to the reservoir 19, which results in an unbalance between the respective pressure of the chambers 20 and 21 of the jack, and in consequence, a displacement of the rod 8 of the jack. This displacement ceases and the rod occupies a new position when the variation of the tractive pull of the counter-acting spring 9 balances the variation of force of the magnetic circuit 10, 11, and the flat slide valve 6 then returns to a position of equilibrium where it remains until the control current in the magnetic circuit is again varied.

As stated above, the hydraulic forces originating from the flow of the liquid through the distributor are not added to the mechanical rigidity of the blades 7. In effect, if said rigidity were zero, the slide valve upon displacement would tend to move unrestrained to an end position. The blades, however, tend to keep the slide valve in a neutral position. There is thus a partial compensation of the blades, rigidity, and this results in a high sensitivity of the distributor and, consequently of the positioning device.

In the construction of the slide valve in FIG. 1, it is seen that there is provided a raised central portion 6a which in a neutral position partially blocks the nozzles 1, 2 in equal amounts whereby pressure in the chambers 20, 21 of the jack are equal and the rod 8 of the jack thereby remains stationary. The fluid flow through the exposed portions of the nozzles beyond the edges of the raised central portion 6a is shown by the arrows in FIG. 1. When the slide valve 6 is in a neutral position the forces exerted on the slide valve by the fluid flowing through the nozzles are equal whereby the slide valve is in equilibrium. In this respect it is to be appreciated that the raised central portion 6a defines an outlet path for the fluid in which the fluid must undergo change of direction. Such change of direction gives rise to so called "Bernoulli forces" which act on the slide valve. Thus, the fluid discharged through nozzle 1 is caused to flow upwardly whereby a downward force is exerted on the slide valve 6. Similarly the flow of fluid from the lower nozzle 2 through the passageway defined by the raised portion 6a of the slide valve 6 causes the application of an upward force on the slide valve.

Thus, if the slide valve 6 is moved downwardly thereby increasing the exposed portion of nozzle 1 the increased fluid flow from nozzle 1 will cause an increased force to be exerted on the slide valve 6a acting in a downwards direction. Moreover, the upward force developed by the flow of fluid from nozzle 2 is reduced by the reduction of the exposed portion of the nozzle 2. Thereby the overall effect of the Bernoulli forces is to apply a force on the slide valve 6 acting in the same direction in which the valve is displaced. This tends to increase the sensitivity of the slide valve since the applied force necessary to displace the slide valve is reduced by the Bernoulli forces.

In FIG. 4 there is shown a modified form of slide valve 6' wherein the above Bernoulli effect is obtained. In FIG. 4 the slide valve 6' employs two sealing members 30, 31 which are secured in the valve 6' and project from the surface thereof. The sealing members 30, 31 are positioned in the valve 6' such that the edges 32, 33 of the sealing members correspond in effect to the edges of the raised central portion 6a of the valve 6 shown in FIG. 1. Thereby fluid which is discharged from the nozzles will flow along the paths shown by the arrows in FIG. 4 and the desired effect of the Bernoulli forces will be obtained.

In effect, therefore, both the members 30, 31 and the raised central portion 6a of the slide valve constitute means for blocking the nozzles and for defining a particular outflow path for the fluid from the nozzles to cause forces to be exerted on the slide valve in a direction corresponding to the direction in which the slide valve is displaced.

As regards the control circuit, it will be observed that it is necessary to compromise between the two following contradictory essentials:

It is necessary on the one hand for a small variation of the control current, and therefore a small variation of the force of the coil 10, to produce a sufficient displacement of the flat slide valve 6 for operation of the jack, this implies a requirement, of low friction and a low strength of the counter-action spring 9.

It is essential on the other hand that a small displacement of the rod 8 of the jack due to the effect of a disturbing force of any kind, must be immediately corrected, which implies, for the displacement of the flat slide valve 6, a substantial variation of the tractive pull of the counter-action spring 9 and therefore a high strength of this spring.

Furthermore, a high strength of the spring 9 would however imply a large force of the coil 10, whereas this force is limited to a fairly low value by reason of the dimensioning of the magnetic circuit 11.

The solution which is a feature of the invention consists in amplifying the force of the coil 10 by means of a lever 12, the articulation of which by the flexible blade 22 introduces as little friction as possible. Flexible blade 22 (FIG. 2) has preferably a section in the form of a cross, formed by means of a main blade and two secondary blades perpendicular to the main blade, so as to withstand the shear stresses which are at right angles to it, while supplying in rotation only a small torsion couple. Thus the lever is articulated by virtue of the elasticity of the blade 22 which thereby limits the friction which is developed. The ratio of the arms of the lever 12 may be so chosen that the gain of the unit has its optimum value. Another simple manner of modifying this again consists in changing the strength of the compensation spring 17, which gives the same effect as varying the rigidity of the suspension of the slide valve.

The invention has therefore the advantage of employing a distributor of the so-called "open center" type with two independent supplies, each corresponding to one chamber of the jack and with a flat slide valve mounted on flexible blades which do not introduce any friction.

A further advantage of the invention is that the unit is simple to machine without requiring any precise tolerances, the nozzles being separately adjusted by lateral movement.

Still a further advantage of the invention is that no adjustment of the clearance between the flat slide valve and the nozzles is necessary: this clearance is zero on assembly but is automatically obtained during operation by the effect of the pressure on the flat slide valve, which causes an elastic elongation of the suspension blades.

Of still further advantage is the construction of the slide valve whereby upon displacement thereof the fluid flow through the nozzles produces forces tending to further displace the slide valve whereby sensitivity is increased and the force necessary to be developed by the control circuit to displace the slide valve is still further reduced.

Another advantage of the particular construction of the device according to the invention which increases the sensitivity of the positioning device is the free suspension of the slide valve 6 between the springs 9 and 17 which are in axial alignment with the intended direction of displacement of the slide valve.

Numerous variations and modifications of the disclosed embodiments will become apparent to those skilled in the art without departing from the scope of the invention as defined in the following claims.

What is claimed is:

1. An electro-hydraulically controlled positioning device comprising a cylinder having two chambers each adapted for being supplied with pressure fluid, a piston slidably supported in said cylinder, a distributor body having a pair of spaced openings each in communication with a respective of said chambers and constituting outlets for said pressure fluid, slide valve means adapted to assume a neutral position in which said outlets are partially closed, means supporting the slide valve means for displacement in opposite directions such that displacement in one direction gradually opens one outlet and closes the other outlet whereas displacement in the opposite direction gradually closes said one outlet and opens said other outlet, said slide valve means including means for closing the outlets and for defining particular outflow paths for fluid discharge through the openings to cause forces to be exerted on the slide valve means by the discharge fluid which act in the direction in which the slide valve means is displaced, said slide valve means being disposed perpendicular to the path of the fluid discharged from the openings and being displaceable in said opposite directions in a plane perpendicular to said path of the fluid discharged from the openings, and means for displacing said slide valve means in said opposite directions and including electrical control means for developing a force to move the slide valve means in correspondence with a desired movement of the piston in the cylinder.

2. A device as claimed in claim 1 wherein said slide valve means comprises a slide valve having a flat surface and a raised central portion with a face parallel to said flat surface, said outlets in said distributor body having orifices lying in a common plane with a determinable distance between said orifices, said face on the central portion of the slide valve lying immediately adjacent and parallel to said plane containing the orifices, the latter said face having a length less than the distance between the orifices such that both orifices are partially open with the flat face positioned symmetrically between said openings in said neutral position.

3. A device as claimed in claim 1 wherein said slide valve means comprises a slide valve having a flat surface and spaced members in said slide valve extending from the flat surface thereof, said outlets in said distributor body having orifices lying in a common plane with a determinable distance between said orifices, said members on the slide valve lying immediately adjacent the orifices, said members being spaced apart a distance less than the distance between the orifices such that both orifices are partially open with the slide valve located in said neutral position in which the members in said slide valve partially block the associated orifice.

4. A device as claimed in claim 3 wherein said members in said slide valve have a rectangular cross-section.

5. A device as claimed in claim 2 wherein said slide valve defines passageways for the outflow of fluid from said orifices, said passageways being bounded by the flat surface of said slide valve, the raised central portion on said flat surface and the distributor body.

6. A device as claimed in claim 3 wherein said members in said slide valve have side edges which respectively face in a direction away from the other of said members, said side edges defining with the surface of the slide valve and the distributor body passageways for the outflow of fluid from the orifices.

7. A device as claimed in claim 1 comprising nozzles in said outlets defining orifices.

8. An electro-hydraulically controlled positioning device comprising a cylinder having two chambers each adapted for being supplied with pressure fluid, a piston slidably supported in said cylinder, a distributor having a pair of spaced openings respectively in communication with said chambers and constituting outlets for said pressure fluid, slide valve means adapted to assume a neutral position in which said outlets are partially closed, means supporting the slide valve means for displacement in opposite directions such that displacement in one direction gradually opens one outlet and closes the other outlet whereas displacement in the opposite direction gradually closes said one outlet and opens said other outlet, said slide valve means including means for closing the outlets and for defining particular outflow paths for fluid discharged through the openings to cause forces to be exerted on the slide valve means by the discharged fluid which act in the direction in which the slide valve means is displaced, said slide valve means being disposed perpendicular to the path of the fluid discharged from the openings and being displaceable in said opposite directions in a plane perpendicular to said path of the fluid discharged from the openings, electrical control means for developing a force to move the slide valve means in correspondence with a desired movement of the piston in the cylinder, said means supporting the slide valve means comprising a spring connected between said piston and said slide valve means to transmit displacement of the piston to the slide valve means, and a second spring axially aligned with the first said spring and having one end secured in adjustable manner and the other end connected to the slide valve means on a side thereof opposite the first said spring, said springs being axially aligned, and means associated with said electrical control means and connected to said slide valve means to apply to said slide valve means a force which is an amplification of the force developed by the electrical control means to displace the slide valve means.

9. A device as claimed in claim 8 wherein said slide valve means comprises a slide valve having a flat surface and a raised central portion with a face parallel to said flat surface, said outlets in said distributor body having orifices lying in a common plane with a determinable distance between said orifices, said face on the central portion of the slide valve lying immediately adjacent and parallel to said plane containing the orifices, the latter said face having a length less than the distance between the orifices such that both orifices are partially open with the flat face positioned symmetrically between said openings in said neutral position.

10. A device as claimed in claim 9 wherein the means supporting the slide valve means further comprises flexible blades connected to the distributor body and the slide valve for elastically supporting the latter.

11. A device as claimed in claim 9 wherein the means which applies an amplified force to the slide valve means from the electrical control means comprises a lever, a blade connected to said lever and to said slide valve, two hollowed out members gripping said blade, and means hingedly supporting the lever between the blade and the electrical control means closer to the former.

12. A device as claimed in claim 11 wherein the means hingedly supporting the lever comprises a flexible blade.

13. A device as claimed in claim 10 wherein said flexible blades extend from the slide valve perpendicular to the plane containing the orifices in a direction towards said plane.

References Cited by the Examiner

UNITED STATES PATENTS 3,003,475  10/61  Rouvalis _____ 91—387
3,101,031  8/63   Crossley _____ 91—364

FOREIGN PATENTS 843,979   7/49   Germany.

SAMUEL LEVINE, *Primary Examiner.*

FRED E. ENGELTHALER, *Examiner.*